UNITED STATES PATENT OFFICE.

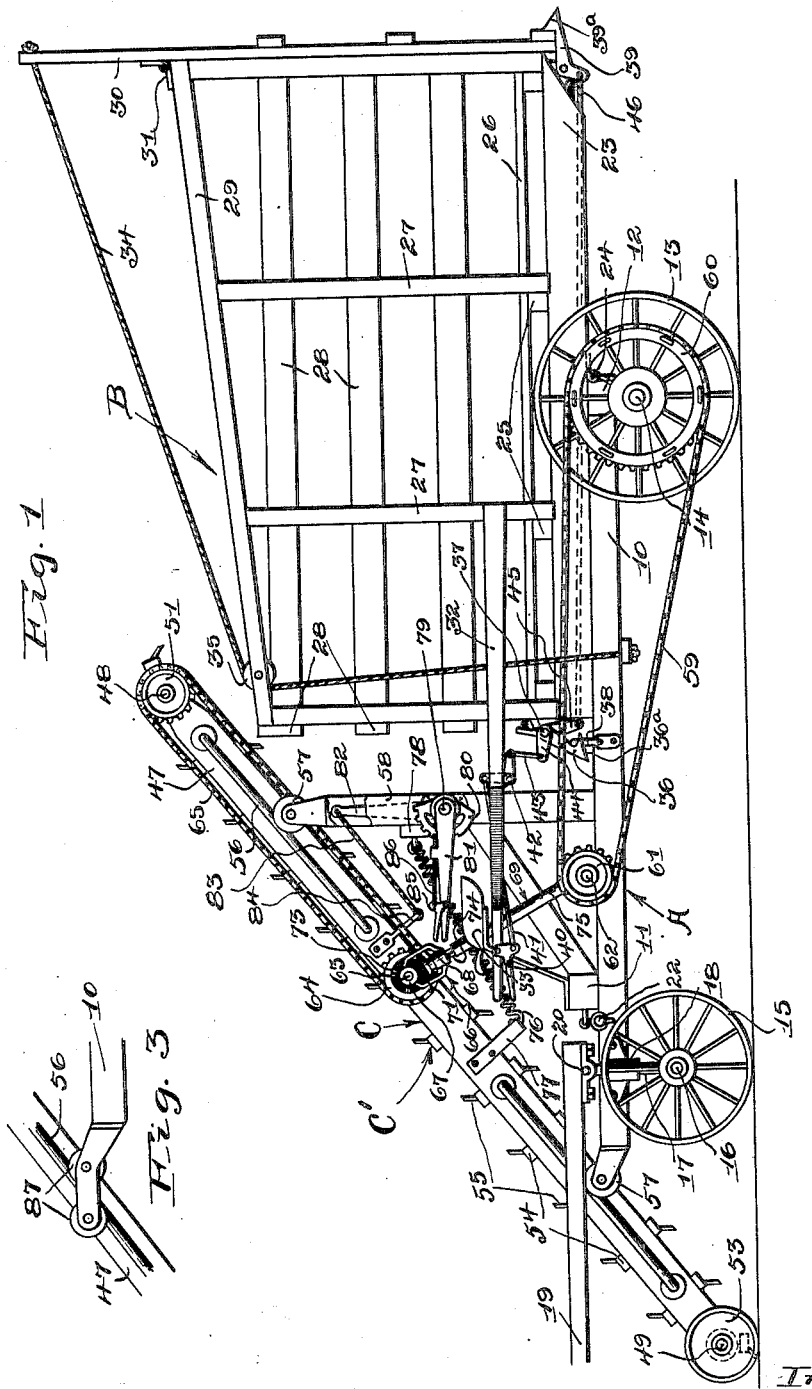

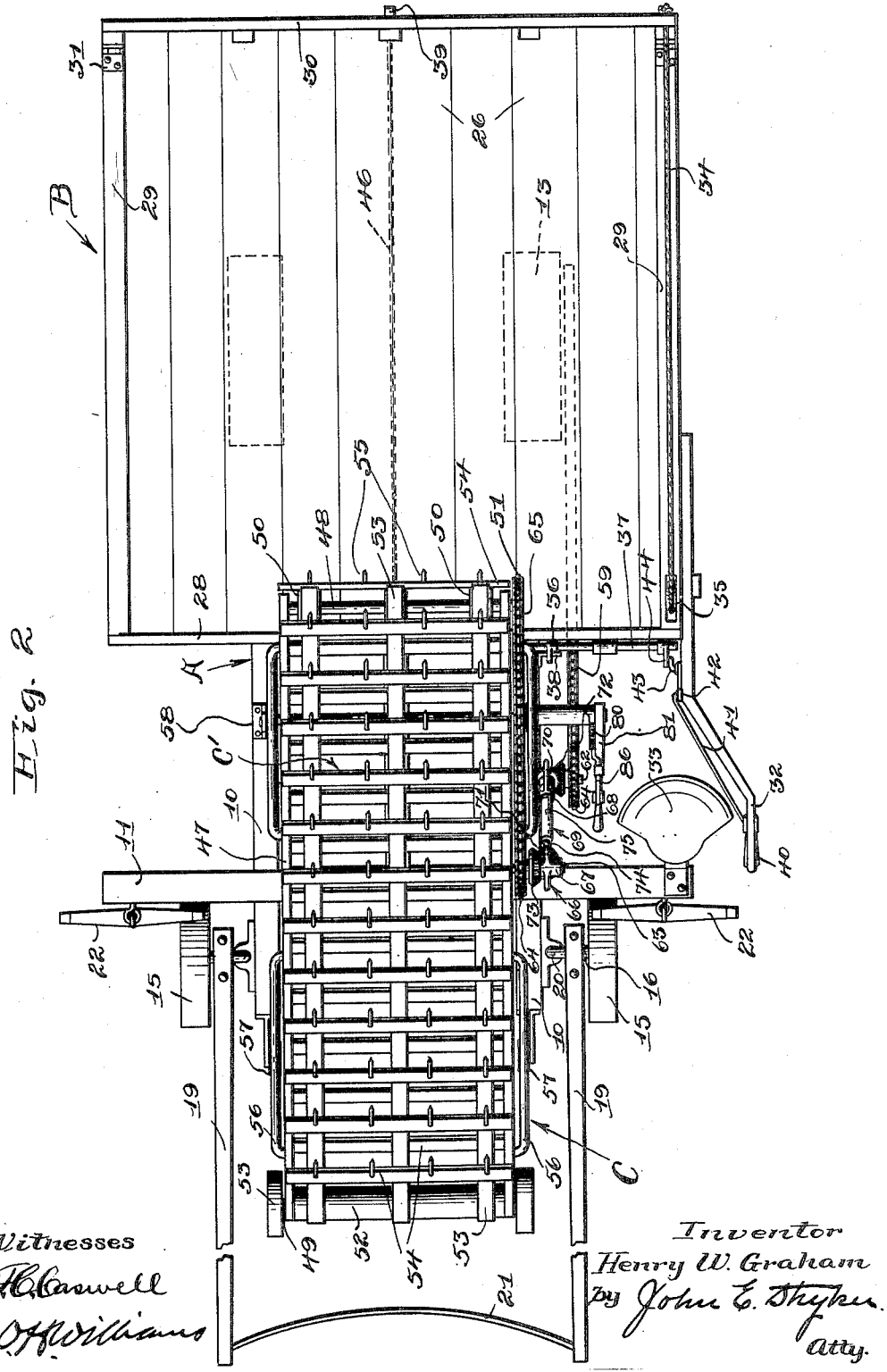

HENRY W. GRAHAM, OF BEARDSLEY, MINNESOTA.

BUNDLE-LOADER.

1,232,284.

Specification of Letters Patent.

Patented July 3, 1917.

Application filed September 14, 1914. Serial No. 861,535.

*To all whom it may concern:*

Be it known that I, HENRY W. GRAHAM, a citizen of the United States, residing at Beardsley, in the county of Bigstone and State of Minnesota, have invented new and useful Improvements in Bundle-Loaders, of which the following is a specification.

My invention relates to improvements in loaders for grain bundles or other material. Its object is to provide a simple, durable and efficient loader of light draft and one which may be easily operated by a single attendant.

In the drawings, Figure 1 is a side elevation of a machine embodying my invention; Fig. 2 is a plan view of the same and Fig. 3, is a side elevation in detail illustrating a modification of a certain part of my improved device.

Referring to the accompanying drawings, I have used the reference letter A to indicate the draft-frame or truck, B the rack on the frame and C the elevator for collecting material from the ground, in front of said frame, and delivering the same into said rack.

The draft-frame A consists of a plurality of parallel beams 10 joined in front by the cross beam 11 and at the rear by the bolster 12. Supporting wheels 13 are journaled upon the axle 14 which is secured beneath said bolster, and steering wheels 15 are swiveled or knuckled upon the outer beams 10 at their forward ends. The swiveled mounting for each steering wheel is formed by journaling the wheel upon the lower horizontal arm 16 of a bracket shaped steering axle, the vertical portion 17 of said axle being revolubly mounted in a bearing 18 upon a beam 10. A tongue 19 is secured to the upper horizontal arm 20 of each steering axle and the two tongues are joined at their forward ends by the rod 21 to synchronize the movement of one steering wheel with the other. Swingletrees 22 for draft animals are attached to the cross beam 11.

In the rack B, longitudinal beams 23 are arranged so that one beam will bear upon a beam 10 of the draft-frame A and each of said beams 23 is secured by a hinge 24 near the center thereof to the bolster 12 of the draft-frame. Transverse tie-braces 25 rigidly join said beams 23 and form a mounting for the floor boards 26 of the rack and for the upright posts 27 which are secured to the ends of said beams. Slats 28 secured to the inner sides of the posts 27 form the forward end and sides of the rack. Rails 29 are nailed upon the tops of the side posts 27 and a slatted gate 30 for the back of said rack is secured to hinges 31 pivoted at the ends of said rails.

A hand-lever 32, accessible from the attendant's seat 33 is secured to the rack and furnishes means by which said rack may be easily tilted rearwardly to empty the same and then returned to upright position.

A gate opening device to automatically open the gate 30 when the rack is tilted rearwardly is provided and consists of a cable 34 which passes over a sheave 35 on the forward end of the rail 29, one end of the cable being attached to the gate 30 above its supporting hinges and the other end to the draft-frame A. The cable is of a length permitting the gate to close when the rack is in upright position, but when said rack is tilted upon the frame the cable is drawn taut and pulls upon the upper portion of the gate thus causing the lower part thereof to swing outward from the rack.

To prevent accidental tipping of the rack, I place a spring-pressed catch 36 upon a rock-shaft 37 mounted at the forward end of the rack, said catch being adapted to engage a lug 38 upon the draft-frame and secure the rack in upright position. A second spring-pressed catch 39 is pivoted at the rear of the rack to engage the lower edge of the gate 30 and retain the same in closed position. These catches are released simultaneously to permit the unloading of the rack. A latch-lever 40 on the rack tilting lever 32 is connected through the rod 41, bell crank 42 and rod 43 with the arm 44 on the rock-shaft 37, and a second arm 45 on said shaft is connected by a cord 46 to the gate catch 39. The manipulation of the latch-lever 40 turns the rock-shaft 37 and disengages the catch 36 from the lug 38 and the catch 39 from the gate 30. Said spring-pressed catches 36 and 39, formed with beveled heads 36ª and 39ª, respectively engage said lug 38 and gate 30 when the rack is returned to upright position.

The inclined elevator C slidably mounted upon the forward end of the draft-frame A is driven from one of the frame supporting wheels 13 and is arranged to receive material from the ground in front of the truck and carry it to the rack B. The elevator frame comprises a pair of side pieces 47 each furnished at its upper and lower ends with journaled shafts 48 and 49, the former being supplied with fixed belt pulleys 50 and a sprocket wheel 51, and the latter with a roller 52 and gage wheels 53 adapted to run upon the ground. The endless apron or carrier C* includes a plurality of belts 53, adapted to travel over said roller 52 and pulleys 50, and slats 54 secured horizontally upon the belts, each of said slats being provided with a series of vertically arranged teeth 55. Rails 56 upon either side of the elevator frame-pieces 47 slide upon rollers 57. One pair of said rollers is mounted on the forward ends of the outer draft-frame beams 10 and a second pair of rollers is carried by posts 58 on said draft-frame. The elevator frame is inclined upon said rollers 57 and slides longitudinally in response to the movements of its gage wheels 53.

Novel driving mechanism for the endless carrier is provided. The chain 59 passes over a sprocket wheel 60 on one of the draft-frame supporting wheels 13 and over a sprocket wheel 61 on the countershaft 62, which is journaled on the beams 10 of the draft-frame. A second counter shaft 63 is journaled in the elevator frame-pieces 47 midway between their ends and a sprocket wheel 64 thereon is geared to the sprocket wheel 51 on the shaft 48, in the upper end of the carrier, by the chain 65. Two similar compound bearings 66, each comprising a pair of bearing members 67 and 68 in right angled position to each other, are furnished, the member 67 of one bearing 66 being journaled upon the counter shaft 62 and the member 67 of the other bearing 66 on the second counter shaft 63. An extensible shaft 69 revoluble within the alined bearing members 68 of said compound bearings 66 is provided at opposite ends with bevel gear wheels 70 and 71, which mesh respectively with bevel gear wheels 72 and 73 on the counter shafts 62 and 63. Through these devices, it will be seen that power is transmitted from the supporting wheel 13 through the counter shafts 62 and 63 and their connections to the pulleys 50 which propel the endless apron C. The flexible shaft 69 consists of a solid member 74 and a hollow member 75 telescopically connected and capable only of longitudinal movements with respect to each other. Said shaft permits free sliding movements of the elevator upon the rollers 57 and transmits power to the same in its various positions. Any ordinary device (not shown) may be employed to throw the elevator driving mechanism out of gear when traveling to and from the field.

A spiral spring 76 attached at one end to a yoke 77 on the elevator frame and at its other end to a brace 78 upon the posts 58 exerts a yielding upward pressure sufficient to nearly counteract the weight of the elevator upon its gage wheels, and as a result the elevator responds very easily to the rise and fall of the gage wheels when passing over inequalities in the ground surface.

A lifting device is provided to raise the elevator and secure the same in inoperative position when the loader is moved from place to place. A shaft 79 is journaled horizontally in the posts 58 and a notched quadrant 80 secured to one of said posts. A hand lever 81 and an arm 82 are fixed upon said shaft. A cord 83 is attached at one end to the middle of the yoke 84 on the elevator frame and the other end is secured to said arm. The hand-lever 81 is supplied with a latch-lever 85 having a dog 86 connected therewith and adapted to engage said notched quadrant 80 and secure the hand-lever 81. Upward movement of the hand lever operates through the shaft 79, arm 82 and cord 83 to raise the elevator to inoperative position, where it may be held by the dog 86. It will be noted that when the hand-lever 81 is set in normal operative position, as shown in Fig. 1, the cord 83 forms a stop to limit the normal downward movement of the elevator. This cord is flexible and permits the raising of the elevator without corresponding movement of the hand-lever 81.

My modified form of elevator mounting, shown in Fig. 3, consists of a pair of spaced rollers 87, between which a rail 47 is slidably held. This structure may be employed in lieu of each roller 57 (illustrated in Figs. 1 and 2) if difficulty be met in retaining the elevator upon the rollers 57.

In operation, the hand-lever 32 and rack B are fixed in the position shown and the machine is driven over the field. Bundles are caught by the teeth 55 in the endless apron C' of the elevator C and delivered into the rack. Said elevator reciprocates in passing over the inequalities of the ground and retains the receiving end in proper position with respect to the ground surface. When the rack is full, the elevator is raised and locked by the manipulation of the lever 81 and the loader is driven to the stack, threshing machine, or other place of delivery, where the contents are emptied by the manipulation of the latch-lever 40 and the upward movement of the hand-lever 32. The rack is again tilted to upright position and locked and the lever 81 returned to normal position to lower the elevator C.

Having described my invention, what I claim as new and desire to protect by Letters Patent, is:

1. In a bundle loader, a truck having supporting wheels therefor, an inclined elevator comprising a frame and an endless apron movably mounted thereon, gage wheels on the elevator frame adapted to bear upon the ground, rails on the sides of said frame, rollers mounted upon the truck to receive said rails, said rollers being arranged to slidably support said frame in inclined relation upon the truck and permit the longitudinal adjustment of said frame on said truck and driving means geared to one of the supporting wheels and to said endless apron for moving the latter.

2. In a bundle loader, a truck having supporting wheels therefor, an inclined elevator comprising a frame and an endless apron movably mounted upon said frame, gage wheels on the elevator frame adapted to run upon the ground, rails on the sides of said frame, rollers mounted upon the truck to receive the rails, said rollers being arranged to slidably support said frame in inclined relation upon the truck and permit the longitudinal adjustment of said frame on said truck, driving means geared to one of the carrying wheels and to said endless apron for moving the latter and a spiral spring secured at one end of the elevator frame and at its other end to the truck, said spring being adapted to nearly counterbalance the weight of the elevator upon the ground.

3. In a bundle loader, a truck having supporting wheels therefor, an inclined elevator comprising a frame and an endless apron movably mounted thereon, rails on the sides of said frame, rollers mounted upon the truck to receive the rails, said rollers being arranged to slidably support said frame in inclined relation upon the truck and permit the longitudinal adjustment of said frame on said truck, driving means geared to one of the carrying wheels and to said endless apron for moving the latter, a rock shaft on the truck, an arm on said shaft, a flexible link connecting said arm with the conveyer frame, a hand lever on said shaft for turning the same to raise the elevator, a fixed notched quadrant adjacent thereto, a latch-lever on said hand-lever and a latch-bolt operated by the latch-lever and adapted to engage the notched quadrant in the position desired.

In testimony whereof, I have signed my name to this specification in the presence of two subscribing witnesses.

HENRY W. GRAHAM.

Witnesses:
W. E. BYERLY,
THORA BRODERSON.